(12) United States Patent
Renggli et al.

(10) Patent No.: US 7,464,536 B2
(45) Date of Patent: Dec. 16, 2008

(54) METHODS AND APPARATUS FOR ASSEMBLING GAS TURBINE ENGINES

(75) Inventors: Bernard James Renggli, Cincinnati, OH (US); Matthew Wilson Jumper, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 11/176,770

(22) Filed: Jul. 7, 2005

(65) Prior Publication Data

US 2007/0125065 A1 Jun. 7, 2007

(51) Int. Cl.
*F02K 3/02* (2006.01)
(52) U.S. Cl. .............................. 60/204; 60/226.3; 60/770
(58) Field of Classification Search .................... 60/204, 60/226.1, 226.3, 262, 266, 770
See application file for complete search history.

(56) References Cited

U.S. PATENT DOCUMENTS

| | | | |
|---|---|---|---|
| 5,182,905 A | 2/1993 | Stransky et al. | |
| 5,184,461 A | 2/1993 | Stransky et al. | |
| 5,335,490 A | 8/1994 | Johnson et al. | |
| 5,404,713 A * | 4/1995 | Johnson | 60/204 |
| 5,680,754 A | 10/1997 | Giffin et al. | |
| 7,216,475 B2 * | 5/2007 | Johnson | 60/226.1 |
| 2005/0081509 A1 * | 4/2005 | Johnson | 60/226.1 |

FOREIGN PATENT DOCUMENTS

| | | |
|---|---|---|
| EP | 0567277 A1 | 10/1993 |
| EP | 1510682 A2 | 3/2005 |
| EP | 1533510 A | 5/2005 |

OTHER PUBLICATIONS

Search Report; Place of Search—Munich; dated Nov. 30, 2006; Application No. 06252376.6—2315; 5 pgs.

* cited by examiner

*Primary Examiner*—Louis J Casaregola
(74) *Attorney, Agent, or Firm*—William Scott Andes, Esq.; Armstrong Teasdale LLP

(57) ABSTRACT

A method is provided for operating a gas turbine engine including a core engine having a core stream duct, an inner bypass duct, an outer bypass duct, and a nozzle assembly downstream of the core engine and including a core engine nozzle and a bypass nozzle separated by a liner. The method includes channeling a first airflow discharged from the core gas turbine engine to the core engine nozzle, and channeling a second airflow through the inner bypass duct such that the second airflow bypasses the core gas turbine engine. The second airflow is channeled to a plurality of fairings that are positioned upstream from a plurality of support struts coupled to the nozzle assembly liner. The method also includes channeling a third airflow through the outer bypass duct such that the third airflow bypasses the core gas turbine engine, wherein the third airflow is channeled through the support struts to the bypass nozzle.

20 Claims, 3 Drawing Sheets

US 7,464,536 B2

METHODS AND APPARATUS FOR ASSEMBLING GAS TURBINE ENGINES

The U.S. Government may have certain rights in this invention pursuant to contract number MDA972-01-3-0002.

BACKGROUND OF THE INVENTION

The present invention relates to gas turbine engines and more particularly, to methods and apparatus to facilitate controlling gas turbine engine bypass airflows.

At least one known gas turbine engine includes, in serial flow arrangement, a forward fan assembly, an aft fan assembly, a high-pressure compressor for compressing air flowing through the engine, a combustor for mixing fuel with the compressed air such that the mixture may be ignited, and a high pressure turbine. The high-pressure compressor, combustor and high-pressure turbine are sometimes collectively referred to as the core engine. In operation, the core engine generates combustion gases which are discharged downstream to a low pressure turbine that extracts energy there from for powering the forward and aft fan assemblies.

In addition to flow considerations, gas turbine engines are also designed to meet stringent noise, weight, and performance requirements. One known type of gas turbine engine is a variable cycle engine (VCE) that is operable in a double bypass mode. More specifically, flow modulation potential is increased by splitting the fan into two sections, wherein each section is in flow communication with a separate concentric bypass duct surrounding the core engine. During operation, the bypass ratio, i.e., the ratio of the quantity of airflow bypassing the core engine to the quantity of airflow passing through the core engine can be varied by selectively mixing or separating the bypass duct stream and the core engine exhaust stream through various systems valuing and mixing systems.

To facilitate enhanced control of the bypass ratio, at least one known VCE includes a nozzle assembly that includes an internal nozzle valve or plug for controlling airflow through the bypass ducts. More specifically, in such engines, the internal plug is supported by a plurality of circumferentially spaced, radically extending support struts that are coupled to the outer duct structure of the engine. As such, because these support struts are positioned within the flow path of the exhausted core engine airflow, the support struts are exposed to high temperature airflows and may be subjected to large thermal gradients generated from the hot core engine airflow and the cool bypass airflow. Over time, the support struts may be prematurely fatigued of damaged due to continued exposure to high operating temperatures generated by the gas turbine engine.

BRIEF DESCRIPTION OF THE INVENTION

In one aspect, a method is provided for operating a gas turbine engine including a core engine having a core stream duct, an inner bypass duct, an outer bypass duct, and a nozzle assembly downstream of the core engine and including a core engine nozzle and a bypass nozzle separated by a liner. The method includes channeling a first airflow discharged from the core gas turbine engine to the core engine nozzle, and channeling a second airflow through the inner bypass duct such that the second airflow bypasses the core gas turbine engine. The second airflow is channeled to a plurality of fairings that are positioned upstream from a plurality of support struts coupled to the nozzle assembly liner. The method also includes channeling a third airflow through the outer bypass duct such that the third airflow bypasses the core gas turbine engine, wherein the third airflow is channeled through the support struts to the bypass nozzle.

In another aspect, a nozzle assembly is provided for an engine including a core engine and at least one bypass duct for channeling airflow around the core engine. The nozzle assembly includes a liner comprising an inner surface and an outer surface, wherein the inner surface confines airflow within a nozzle bypass duct, and the outer surface confines airflow discharged from the core engine. A plurality of strut members are coupled to and support the liner. A plurality of fairings are in flow communication with the at least one bypass duct, and each fairing is upstream from a respective one of the plurality of strut members to facilitate directing a portion of the airflow from the bypass duct past the plurality of strut members.

In yet another aspect, a gas turbine engine assembly is provided including a core gas turbine engine including a core engine airflow stream, at least one core engine bypass duct channeling a bypass airflow stream there through, and a nozzle assembly downstream of the core engine and the at least one core engine bypass duct. The nozzle assembly includes a liner separating airflow discharged from the core engine from airflow within a nozzle bypass duct. A plurality of strut members are coupled to and support the liner, and a plurality of fairings are in flow communication with the at least one core engine bypass duct. Each of the plurality of fairings are positioned upstream from a respective one of the plurality of strut members and channel a portion of airflow from the core engine bypass duct to the plurality of strut members.

DETAILED DESCRIPTION OF THE INVENTION

Figure 1:
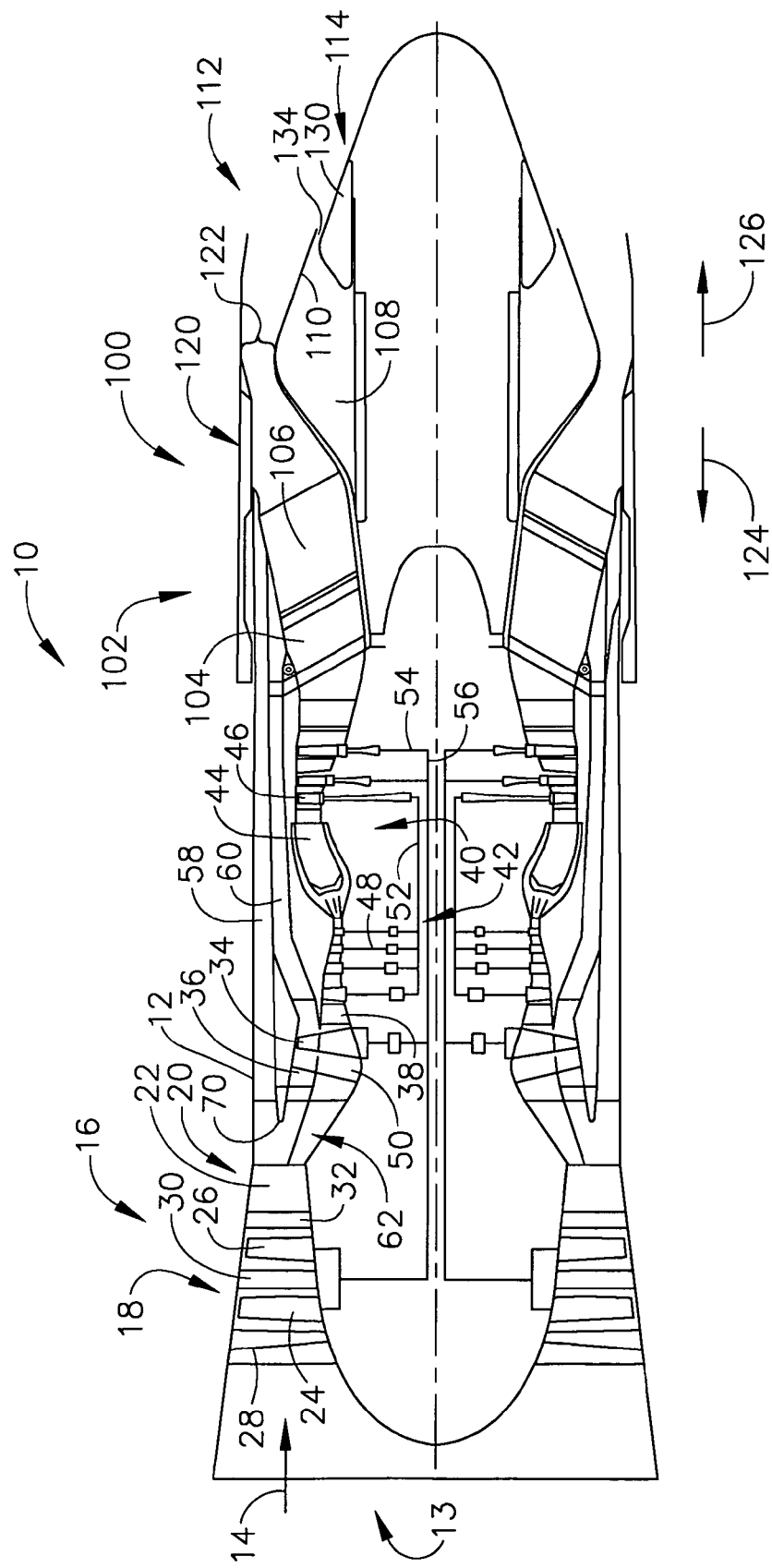
FIG. 1 is a schematic illustration of an exemplary gas turbine engine.

FIG. 1 is a cross-sectional view of a portion of an exemplary gas turbine engine 10 that includes an outer casing 12 having an upstream end 13 that forms an inlet 14 sized to provide a predetermined quantity of airflow to the engine 10. Disposed within inlet 14 is a fan 16 for receiving and compressing airflow channeled through inlet 14. Fan 16 includes a forward section 18 that is axially displaced from an aft section 20 by an axial space 22. In the exemplary embodiment, forward section 18 includes a pair of rows of rotor blades 24 and 26 that are interspaced between rows of inlet guide vanes 28 and stator vanes 30 and 32. Similarly, aft fan section 20 includes at least one stage of rotor blades 34 that are interspaced between adjacent rows of aft fan stator vanes 36 and 38.

Gas turbine engine 10 also includes a core engine 40 that is downstream of fan 16. In the exemplary embodiment, core engine 40 includes an axial flow compressor 42 upstream of a combustor 44 and a high pressure turbine 46. Turbine 46 drives a rotor 48.

During operation, air compressed by fan 16 is channeled through a core engine inlet duct 50, and is further compressed by axial flow compressor 42. Compressed air is then channeled to combustor 44 wherein fuel is injected to create high energy combustion gases used to drive core engine turbine 46, which, in turn, drives rotor 48 through a shaft 52. High temperature combustion gases are then routed to drive a low-pressure turbine 54 which, in turn, drives fan 16 through shaft 56.

In the exemplary embodiment, gas turbine engine 10 also includes an outer bypass duct 58 that is radically inward of outer casing 12, and an inner bypass duct 60 that is positioned radically inward of outer bypass duct 58. Ducts 58 and 60 enable a portion of fan airflow to bypass and flow around core engine 40. In the exemplary embodiment, outer bypass duct 58 and inner bypass duct 60 each substantially circumscribe core gas turbine engine 10. In an alternative embodiment, engine 10 includes a single bypass duct. In another alternative embodiment, engine 10 includes another bypass duct, such as, for example, a fade duct (not shown).

In the exemplary embodiment, during operation, air is channeled from fan 16 and separated into a plurality of flow paths 62. Specifically, a first portion of airflow is channeled through outer bypass duct 58 towards a nozzle assembly 100. A second portion of airflow is channeled through inner bypass duct 60, and radically inward of a splitter 70, toward a variable area bypass injector (VABI) 102. A third portion of airflow is channeled into core gas turbine engine 40. Accordingly, as described herein, the air discharged from fan 16 is separated into three separate flow paths 62 within gas turbine engine 10. In alternative embodiments, more or less than three flow paths 62.

In the exemplary embodiment, VABI 102 facilitates combining and/or mixing at least a portion of airflow channeled through inner bypass duct 60 with core engine combustion gases exiting low-pressure turbine 54. The combined airflow is then channeled to nozzle assembly 100. Specifically, in the exemplary embodiment, the airflow channeled through inner bypass duct 60 is channeled to a hollow fairing 104 coupled aft of core gas turbine engine 10. Additionally, airflow channeled through outer bypass duct 58 is channeled through a hollow strut 106 coupled aft of fairing 104. As such, fairing 104 and strut 106 define VABI 102. In one embodiment, bypass airflow from each of outer and inner bypass ducts 58 and 60 is exhausted into a nozzle bypass duct 108 via fairings 104 and struts 106, respectively. The bypass airflow is the exhausted from nozzle bypass duct 108 through nozzle assembly 100. Moreover, an inner liner 110 defines an outer surface of nozzle bypass duct 108 and facilitates separating the airflow in nozzle bypass duct 108 from the combined airflow channeled downstream of VABI 102. In the exemplary embodiment, inner liner 110 is supported by struts 106 and/or fairings 104.

In the exemplary embodiment, gas turbine engine 10, and more particularly, nozzle assembly 100, includes a core nozzle assembly 112, i.e. an annular core nozzle shroud, and a bypass nozzle assembly 114. Core nozzle assembly 112 facilitates regulating the quantity of airflow exhausted there through. Specifically, airflow exhausted through core nozzle assembly includes the combined airflow channeled from VABI 102. Bypass nozzle assembly 114 facilitates regulating the quantity of airflow exhausted there through from nozzle bypass duct 108. As such, nozzle assemblies 112 and 114 are separated by inner liner 110.

In the exemplary embodiment, core nozzle assembly 112 includes a core nozzle valve 120, i.e. an annular shroud, that is coupled to outer casing 12. In an alternative embodiment, valve 120 is an assembly of overlapping flaps and seals. In one embodiment, core nozzle assembly 112 is a variable area core nozzle assembly wherein various mechanical devices actuate valve 120 to vary the size of a throat area 122. Throat area 122 is the minimum flow area defined between valve 120 and inner liner 110. In one embodiment, core nozzle valve 120 may be actuated using a hinge (not shown). In the exemplary embodiment, core nozzle valve 120 is translatable in an axially forward direction 124 and an axially aft direction 126. In an alternative embodiment, core nozzle valve 120 is fixedly coupled to outer casing 12.

In use, core nozzle valve 120 controls the size of throat area 122 to facilitate regulating a quantity of air channeled through throat area 122. More specifically, and in the exemplary embodiment, core nozzle valve 120 is translated in forward direction 124 to facilitate increasing a quantity of airflow that is channeled through throat area 122. Alternatively, core nozzle valve 120 is translated in aft direction 126 to facilitate reducing the quantity of airflow channeled through throat area 122.

In the exemplary embodiment, bypass nozzle assembly 114 includes a bypass nozzle valve 130, i.e. a plug, that is coupled to a portion of engine 10 such as a stationary engine structure. In an alternative embodiment, valve 130 is an assembly of flaps. In one embodiment, bypass nozzle assembly 114 is a variable area nozzle wherein actuation is accomplished using various mechanical devices to vary the size of a throat area 134 defined between valve 130 and inner liner 110. For example, bypass nozzle valve 130 may be actuated using a hinge (not shown). In the exemplary embodiment, bypass nozzle valve 130 is translatable in axially forward direction 124 to and an axially aft direction 126. In an alternative embodiment, bypass nozzle valve 130 is fixedly coupled to an engine structure.

In the exemplary embodiment, during operation, bypass nozzle valve 130 is movable to facilitate regulating and/or varying a quantity of airflow channeled through throat area 134. More specifically, and in the exemplary embodiment, bypass nozzle valve 130 is translated in forward direction 124 to facilitate increasing a quantity of airflow that is channeled through throat area 134. Alternatively, bypass nozzle valve 130 is translated in aft direction 126 to facilitate reducing the quantity of airflow channeled through throat area 134. Accordingly, variable area nozzle valve 130 facilitates regulating the quantity of airflow that is channeled from bypass nozzle duct 108 to the exhaust without mixing with the gas turbine exhaust.

Figure 2:
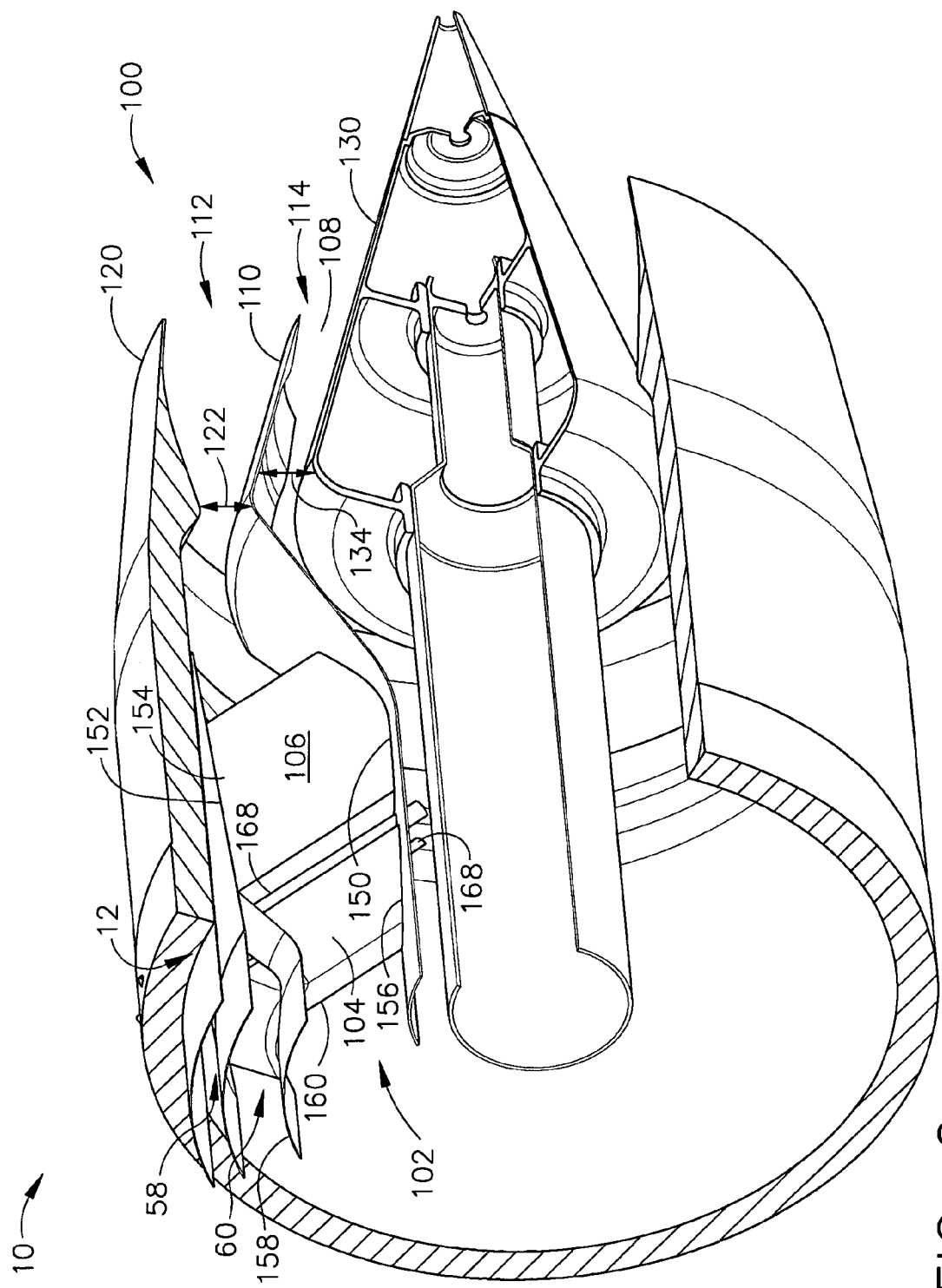
FIG. 2 is a perspective view of an exemplary nozzle assembly that can be used with the gas turbine engine shown in FIG. 1.
Figure 3:
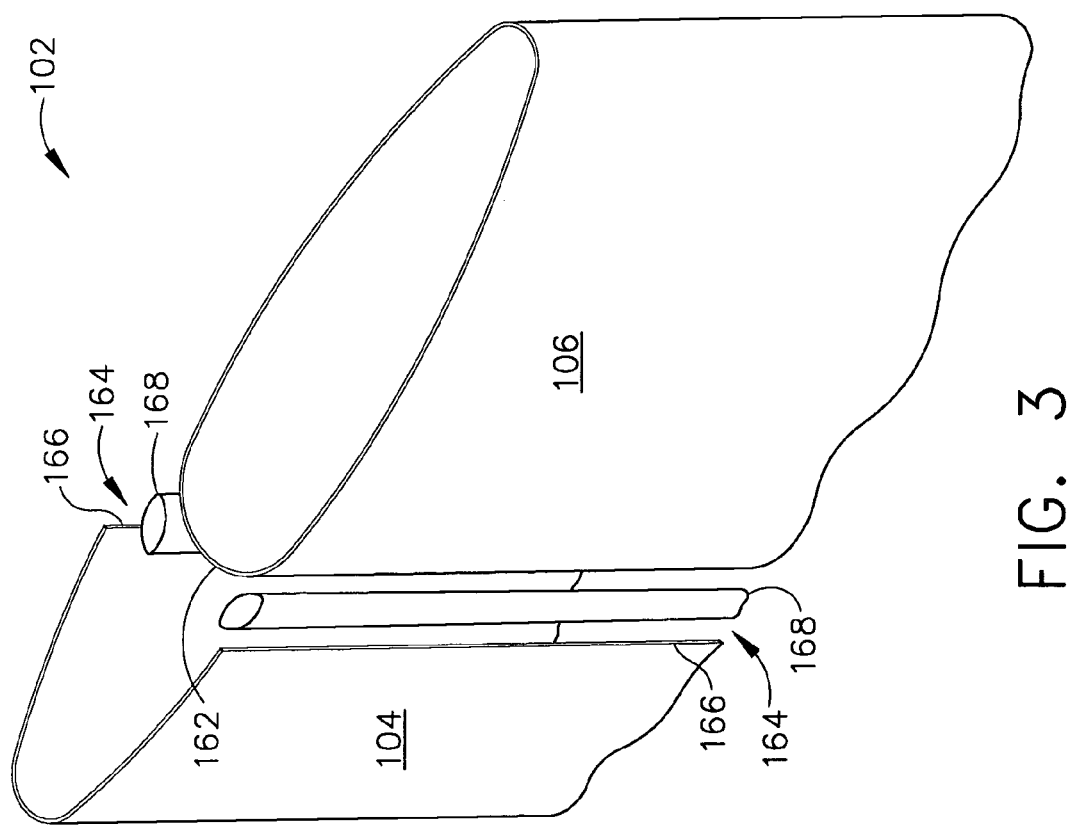
FIG. 3 is a perspective view of a portion of the nozzle assembly shown in FIG. 2.

FIG. 2 is a perspective view of nozzle assembly 100 for use with gas turbine engine 10, and FIG. 3 is a perspective view of a portion of nozzle assembly 100. Nozzle assembly 100 includes core nozzle assembly 112 for exhausting core engine air and bypass air combined using VABI 102, and bypass nozzle assembly 114 for exhausting bypass air channeled through nozzle bypass duct 108. Inner liner 110 separates the airflows in each of core and bypass nozzle assemblies 112 and 114.

In the exemplary embodiment, inner liner 110 is supported by strut 106 and/or fairing 104. Specifically, nozzle assembly 100 includes a plurality of circumferentially spaced apart, and radically extending hollow support struts 106. Each strut 106 extends between, and is coupled to, inner liner 110 at a base 150 of each strut 106 and duct structure, such as a duct liner 152, at an upper end 154 of each strut 106. In an alternative embodiment, each strut 106 is coupled to outer casing 12. In one embodiment, each support strut 106 is integrally formed with one of inner liner 110 and/or duct liner 152. In the exemplary embodiment, each strut 106 is in flow communication with outer bypass duct 58 at upper end 154, such that the bypass airflow is channeled through the hollow portion, or interior, of each strut 106. As such, struts 106 are internally or convectively cooled by the bypass airflow. In the exemplary embodiment, each strut 106 is also in flow communication with nozzle bypass duct 108 at base 150, such that the bypass airflow channeled through each strut 106 is exhausted into nozzle bypass duct 108, and eventually exhausted from bypass nozzle assembly 114.

Moreover, nozzle assembly 100 includes a plurality of circumferentially spaced apart, and radically extending fairings 104. Each fairing 104 is positioned directly upstream of a corresponding support strut 106 and facilitates shielding each strut 106 from combustion gases and/or high temperature airflow flowing along the exterior surface of each strut 106. Additionally, each fairing 104 extends between, and is coupled to, inner liner 110 at a base 156 of each fairing 104 and the duct structure, such as a duct liner 158, at an upper end 160 of each fairing 104. In an alternative embodiment, each fairing 104 is coupled to outer casing 12. In one embodiment, each fairing 104 is integrally formed with one of inner liner 110 and/or duct liner 158. In the exemplary embodiment, each fairing 104 is in flow communication with inner bypass duct 60 at upper end 160, such that bypass airflow flowing within bypass duct 60 is channeled through the hollow portion, or interior, of each fairing 104. As such, fairings 104 are cooled by bypass airflow channeled there through. In the exemplary embodiment, each fairing 104 is also in flow communication with nozzle bypass duct 108 at base 156, such that bypass airflow channeled through each fairing 104 is exhausted into nozzle bypass duct 108, and eventually exhausted from bypass nozzle assembly 114.

In the exemplary embodiment, duct liner 158 defines a radically inner surface of inner bypass duct 60. Additionally, duct liner 152 defines a radically outer surface of inner bypass duct 60 and a radically inner surface of outer bypass duct 58. In the exemplary embodiment, the radically outer surface of outer bypass duct 58 is defined by outer casing 12. In an alternative embodiment, engine may include additional bypass ducts defining the radically outer surface of outer bypass duct 58.

In the exemplary embodiment, and as best illustrated in FIG. 3, airflow channeled through each fairing 104 is directed along a portion of a corresponding strut 106. In the exemplary embodiment, the air flows through each fairing 104 along a leading edge 162 of each strut 106. Additionally, a portion of the airflow channeled through each fairing 104 may be exhausted through exit slots 164 positioned at a downstream end 166 of each fairing 104. More specifically, airflow is exhausted along corresponding support struts 106 to facilitate cooling the outer surface of each strut 106. Additionally, the exhausted airflow is mixed with the air flowing through core nozzle assembly 112. The portion of the airflow not exhausted through exit slots 164 is channeled through fairings 104 and exhausted into nozzle bypass duct 108, as described above.

In the exemplary embodiment, a valve 168 is included within or proximate each exit slot 164 to control an amount of airflow exhausted through each exit slot 164. In one embodiment, valves 168 are rotated to increase or decrease the size of each exit slot 164. In another embodiment, valves 168 are actuated or translated into and/or out of exit slots 164 to increase or decrease the size of each exit slot 164. In one embodiment, valves 168 are selectively moveable between a fully closed position and a fully open position. In the fully closed position, substantially all of the air flowing through fairings 104 is channeled to nozzle bypass duct 108. In the fully open position substantially all of the air flowing through fairings 104 is exhausted through exit slots 164. Alternatively, valves 168 are stationary members and fairings 104 and/or struts 106 are moveable relative to valves 168. For example, fairings 104 and/or struts 106 are translated generally toward or away from valves 168, or alternatively, fairings 104 and/or struts 106 are hinged relative to valves 168 to increase or decrease the distance from valve 168 to fairings 104 and/or struts 106.

As described above, the air flowing through each fairing 104 is channeled to nozzle bypass duct 108. As additionally described above, the air flowing through each support strut 106 is channeled to nozzle bypass duct 108. As such, the airflows from fairings 104 and struts 106 are combined within nozzle bypass duct 108, channeled there through, and exhausted from engine 10 via bypass nozzle assembly 114. Bypass air channeled through nozzle bypass duct 108 facilitates back side cooling inner liner 110, as high temperature combustion gases are channeled along the radically outer surface of liner 110.

In the exemplary embodiment, bypass nozzle valve 130 controls the amount of airflow exhausted by bypass nozzle assembly 114. Specifically, bypass nozzle valve 130 increases and/or decreases the size of throat area 134. In one embodiment, the amount of airflow entering nozzle bypass duct 108 is controlled using bypass nozzle valve 130. Specifically, by decreasing throat area 134, less airflow is exhausted from nozzle bypass duct 108, and as such, less airflow can enter bypass nozzle duct 108. As a result, more airflow is exhausted from each fairing 104 via exit slots 164. Accordingly, the amount of airflow exhausted through exit slots 164 may be controlled via bypass nozzle valve 130. In an alternative embodiment, a fairing base valve (not shown) may be coupled proximate fairing base 156 for controlling an amount of airflow exhausted from fairing 104 into nozzle bypass duct 108.

The above-described gas turbine engine and nozzle assembly operate in a cost-effective and reliable manner. The engine includes a core engine and a plurality of bypass ducts. In the exemplary embodiment, the engine includes a VABI for mixing a portion of the airflow in the bypass ducts with the airflow exhausted from the core engine. The combined airflow and the bypass airflow are exhausted through the nozzle assembly. In the exemplary embodiment, the nozzle assembly includes a core nozzle assembly for exhausting the combined airflow and a bypass nozzle assembly for exhausting the bypass airflow. An inner liner is provided to separate each airflow, and the inner liner is supported by a plurality of support struts. The support struts are positioned within the combined airflow stream. As such, the support struts are subjected to high temperatures and high temperature gradients. Accordingly, a plurality of fairings are positioned upstream of the support struts to shield the support struts from the high temperature airflow. In the exemplary embodiment, the fairings are in flow communication with at least one of the bypass ducts. As a result, the cool bypass air is utilized to cool the support struts. In the exemplary embodiment, valves are coupled to the fairings for controlling an amount of bypass airflow exhausted onto the support struts. As a result, the nozzle assembly facilitates operating the engine in a cost effective and reliable manner by directing cooling fluid to the various engine components in a cost effective and reliable manner.

Exemplary embodiments of gas turbine engines are described above in detail. The engines are not limited to the specific embodiments described herein, but rather, components of each engine may be utilized independently and separately from other components described herein. For example, each engine component can also be used in combination with other engine components.

While the invention has been described in terms of various specific embodiments, those skilled in the art will recognize that the invention can be practiced with modification within the spirit and scope of the claims.

What is claimed is:

1. A method for operating a gas turbine engine including a core engine having a core stream duct, at least one bypass duct, and a nozzle assembly downstream of the core engine and including a core engine nozzle and a bypass nozzle separated by a liner, said method comprising:

channeling a first airflow discharged from the core gas turbine engine to the core engine nozzle; and channeling a second airflow through the at least one bypass duct such that the second airflow bypasses the core gas turbine engine, wherein the second airflow is channeled through a plurality slots defined at a downstream end of a plurality of fairings, wherein the plurality of fairings are upstream from a plurality of support struts coupled to the nozzle assembly liner, such that at least a portion of the second airflow is mixed with the first airflow.

2. A method in accordance with claim 1 wherein the gas turbine engine includes an inner bypass duct and an outer bypass duct, said channeling a second airflow comprises channeling a second airflow through the inner bypass duct, and said method further comprises channeling a third airflow through the outer bypass duct such that the third airflow bypasses the core gas turbine engine, wherein the third airflow is channeled through the support struts to the bypass nozzle.

3. A method in accordance with claim 1 further comprising channeling at least a portion of the second airflow to the bypass exhaust nozzle through the fairings.

4. A method in accordance with claim 1 further comprising:

channeling at least a portion of the second airflow channeled to the plurality of fairings to the support struts; and controlling an amount of airflow channeled to the support struts using a valving system.

5. A method in accordance with claim 1 wherein the bypass nozzle is in flow communication with the fairing, said method further comprising:

channeling at least a portion of the second airflow channeled to the plurality of fairings to the support struts; and controlling an amount of the second airflow channeled to the support struts by controlling an amount of airflow channeled through the bypass nozzle.

6. A method in accordance with claim 1 further comprising controlling an amount of the second airflow mixed with the first airflow using a valve positioned between the plurality of fairings and the plurality of support struts.

7. A method in accordance with claim 1 wherein said channeling a second airflow further comprises channeling the second airflow along an outer surface of the support struts to facilitate film cooling the outer surface of each of the support struts.

8. A nozzle assembly for an engine including a core engine and at least one core engine bypass duct for channeling airflow around the core engine, said nozzle assembly comprising:

a liner comprising an inner surface and an outer surface, said inner surface confining airflow within a nozzle bypass duct, said outer surface confining airflow discharged from the core engine;

a plurality of strut members coupled to and supporting said liner;

a plurality of fairings in flow communication with the at least one core engine bypass duct, each said fairing upstream from a respective one of said plurality of strut members to facilitate directing a portion of the airflow from at least one core engine bypass duct towards said plurality of strut members through a plurality of slots defined at a downstream end of said plurality of fairings.

9. A nozzle assembly in accordance with claim 8 wherein the at least one core engine bypass duct includes an inner bypass duct and an outer bypass duct, the inner bypass duct in flow communication with said fairing, the outer bypass duct in flow communication with said strut, each of said fairing and said strut in flow communication with said nozzle bypass duct, wherein at least a portion of the airflow from each of the inner and outer bypass ducts is exhausted from said nozzle bypass duct.

10. A nozzle assembly in accordance with claim 8 wherein said nozzle assembly further comprises a core nozzle exhaust and a bypass nozzle exhaust, said liner defining each of said core and bypass nozzle exhausts.

11. A nozzle assembly in accordance with claim 8 wherein the portion of the airflow directed from the core engine bypass duct towards said plurality of strut members by said plurality of fairings is controlled by varying a throat area of one of a core exhausts and a nozzle exhaust.

12. A nozzle assembly in accordance with claim 8 wherein each of said plurality of fairings comprises a valve positioned between said plurality of fairings and said plurality of strut members, said valve facilitates controlling an amount of airflow channeled toward said plurality of strut members.

13. A nozzle assembly in accordance with claim 8 wherein the portion of the airflow directed from the core engine bypass duct past said plurality of strut members by said plurality of fairings is mixed with the airflow discharged from the core engine.

14. A gas turbine engine assembly comprising:

a core gas turbine engine comprising a core engine airflow stream;

at least one core engine bypass duct channeling a bypass airflow stream therethrough; and a nozzle assembly downstream of said core engine and said at least one core engine bypass duct, said nozzle assembly comprising a liner separating airflow discharged from said core engine from airflow within a nozzle bypass duct, a plurality of strut members coupled to and supporting said liner, and a plurality of fairings in flow communication with said at least one core engine bypass duct, each of said plurality of fairings positioned upstream from a respective one of said plurality of strut members and channeling a portion of airflow from said core engine bypass duct towards said plurality of strut members through a plurality of slots defined at a downstream end of said plurality of fairings.

15. A gas turbine engine assembly in accordance with claim 14 wherein a portion of the bypass airflow stream is mixed with the core engine stream discharged from the core engine upstream of said nozzle assembly using a variable area bypass injector.

16. A gas turbine engine assembly in accordance with claim 14 wherein said at least one core engine bypass duct comprises an inner bypass duct positioned radially outward from said core gas turbine engine and an outer bypass duct positioned radially outward from said inner bypass duct, each of said plurality of fairings in flow communication with said inner bypass duct, each of said plurality of strut members in flow communication with said outer bypass duct.

17. A gas turbine engine assembly in accordance with claim 14 wherein each of said plurality of fairings and said plurality of strut members in flow communication with said nozzle bypass duct.

18. A gas turbine engine assembly in accordance with claim 14 wherein each of said plurality of fairings comprises a valve that facilitates controlling an amount of airflow channeled toward said plurality of strut members.

19. A gas turbine engine assembly in accordance with claim 14 wherein the portion of the airflow channeled from each of said plurality of fairings to said plurality of strut members is channeled along an outer surface of said plurality of strut members to facilitate film cooling said outer surface of said plurality of strut members.

20. A gas turbine engine assembly in accordance with claim 14 further comprising a valve positioned between each of said plurality of fairings and said plurality of strut members, said valve facilitates combining an amount of the airflow channeled from each of said plurality of fairings with the airflow discharged from said core engine.

* * * * *